(12) United States Patent
Lammintaus et al.

(10) Patent No.: US 6,757,157 B2
(45) Date of Patent: Jun. 29, 2004

(54) FOLDING ELECTRONIC DEVICE

(75) Inventors: Arto Lammintaus, Pirkkala (FI); Pekka Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 25 days.

(21) Appl. No.: 10/112,382

(22) Filed: Mar. 29, 2002

(65) Prior Publication Data

US 2002/0154475 A1 Oct. 24, 2002

(30) Foreign Application Priority Data

Apr. 2, 2001 (FI) .............................................. 20010681

(51) Int. Cl.[7] .............................................. G06F 1/16
(52) U.S. Cl. .................... 361/681; 361/683; 345/168; 345/173
(58) Field of Search ................................. 361/680, 681, 361/683, 686; 364/705.01, 514, 708.1, 448, 709.01; 345/1, 5, 102, 104, 173, 145, 156–159, 161; 16/342, 366, 308, 309; 348/552; 312/223.1, 223.2; 248/118, 118.1, 118.3, 118.5, 418

(56) References Cited

U.S. PATENT DOCUMENTS

| | | | | |
|---|---|---|---|---|
| 5,438,475 A | * | 8/1995 | Bradley | 361/683 |
| 5,594,619 A | * | 1/1997 | Miyagawa et al. | 361/681 |
| 5,666,694 A | * | 9/1997 | Slow et al. | 16/368 |
| 5,793,311 A | * | 8/1998 | Wood | 341/22 |
| 5,864,334 A | * | 1/1999 | Sellers | 345/168 |
| 5,887,995 A | * | 3/1999 | Holehan | 400/479.1 |
| 5,889,508 A | * | 3/1999 | Slotta | 345/161 |
| 5,898,600 A | * | 4/1999 | Isashi | 708/105 |
| 5,900,848 A | * | 5/1999 | Haneda et al. | 345/1.1 |
| 6,046,728 A | * | 4/2000 | Hume et al. | 345/157 |
| 6,154,359 A | * | 11/2000 | Kamikakai et al. | 361/681 |
| 6,262,716 B1 | * | 7/2001 | Raasch | 345/168 |
| 6,424,338 B1 | * | 7/2002 | Anderson | 345/173 |

FOREIGN PATENT DOCUMENTS

| | | | | |
|---|---|---|---|---|
| EP | 0963090 A2 | | 12/1999 | |
| EP | 1 016 951 A1 | * | 5/2000 | G06F/1/16 |
| GB | 2344905 A | | 6/2000 | |
| JP | 02001125668 A | * | 5/2001 | G06F/1/16 |

* cited by examiner

Primary Examiner—Michael Datskovsky
(74) Attorney, Agent, or Firm—Perman & Green, LLP

(57) ABSTRACT

A folding electronic device comprising a first part and a second part arranged to turn with respect to the first part. The first part comprises data input means and the second part comprises a display unit. The parts can be turned with respect to each other into a folded position and an open position. In the folded position, the data input means and the display unit are on different, outer sides of the device and at least some of the data input means are arranged to operate as a pointing device of the display.

28 Claims, 3 Drawing Sheets

FOLDING ELECTRONIC DEVICE

Figure 1A:
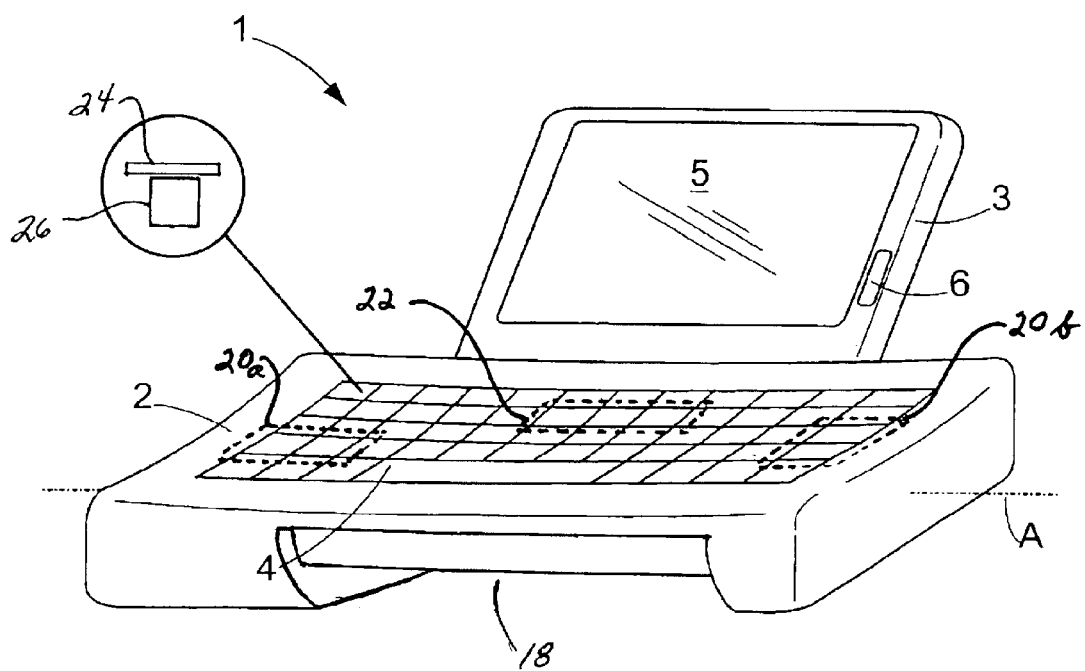

The invention relates to a folding electronic device comprising a first part and a second part arranged to turn with respect to the first part, the parts being turnable with respect to each other into a folded position and an open position, the first part comprising at least data input means and the second part comprising at least a display unit.

Folding electronic devices are known, which comprise a first part and a second part turnably attached to the first part. Most typically, the parts are combined by various hinge solutions in such a device. This kind of electronic devices—hereinafter referred to as device in this application—are typically e.g. mobile phones, laptops, communicators, portable computers, combinations thereof or other similar devices. By turning the device into an open position, i.e. by turning the first part apart from the second part, we obtain data input means—generally a keyboard—the size of which usually equals the size of substantially the entire first part and, correspondingly, a display unit the size of which equals the size of substantially the entire second part. In order to facilitate carrying and handling of the device, the parts can be folded into a folded position, in which case the above mentioned display and data input means are covered inside the device.

The device must thus be opened into an open position in order to see and use the display unit and the keyboard. In most situations this is difficult and in some situations even impossible. To avoid the problem, solutions have been disclosed, in which the device is provided with a second display unit and a simplified keyboard, which can be used when the device is in the folded position. The second display unit and the keyboard are usually small and thus they are mostly suitable for performing conventional mobile phone functions. When the device is used, for instance, as a calendar, means for taking notes, address book or for some other PDA (Personal Digital Assistant) use, the device is opened so that the bigger display unit and the keyboard, typically a QWERTY keyboard, can be used. The solution as such is good, but it causes component and assembly costs and makes the device both bigger and heavier. In addition, it is very difficult to take the bigger display of such devices into use, if only one hand can be used for handling the device. An example of such a situation is when someone is using the device while standing in a crowded bus.

The purpose of the present invention is to provide a folding electronic device, whereby the above mentioned drawbacks are avoided.

The electronic device of the invention is characterized in that in the folded position, the data input means and the display unit are on different, outer sides of the device and that at least some of the data input means are arranged to operate as a display pointing device of said display unit.

The essential idea of the invention is that in the folded position where the first part is turned against the second part, the data input means are on the outer side of the first part of the device and, correspondingly, the display unit is on the outer side of the second part, i.e. on the reverse side of the device, or on the device side facing away from the data input means, and that when the device is in the folded position, at least some of said data input means can be used as a pointing device of the display, by which information displayed with the display unit is controlled. Furthermore, an idea of a preferred embodiment is that the data input means consist of a keyboard with a first operational mode and a second operational mode, and in the first operational mode the keyboard is arranged to operate as a data input means and in the second operational mode the keyboard or a part of it is arranged to operate as a pointing device of the display. The idea of a second preferred embodiment is further that the keyboard is a pointing device of a touchpad type, provided with figures representing the keys of the keyboard. The idea of a third preferred embodiment is that the dimensions of the pointing device of the display and those of the display unit are substantially similar, preferably even of the same size. The idea of a fourth preferred embodiment is that in the open position where the keyboard and the display are on the same side of the device, operational elements arranged on the side of the first part that faces away from the keyboard can be used as a pointing device of the display.

The invention provides the advantage that the device only comprises one display unit, and thus the structure of the device is simple and the component and assembly costs are low. The display unit is big and the user can use it both in the folded position and in the open position, wherefore the device user is able to use the functions utilizing the display unit quickly and easily. The device is compact, because the bottom side of the device is utilised as a location for the data input means. A preferred embodiment provides the advantage that space utilisation is particularly efficient, because the keyboard is used as a pointing device of the display. The pointing device of the display can be made large, and thus it is easy to control the information of the display unit. A second preferred embodiment provides the advantage that the touchpad keyboard is thin and light and its operational mode can be adapted according to the user's wishes. A third preferred embodiment provides the advantage that since the dimensions of the pointing device of the display and those of the display unit are substantially similar, the information of the display unit can be controlled very precisely and in a straightforward manner. Even though the user does not see the pointing device underneath the device, it is easy for him to see what kind of effect his finger movements have on the display. The pointing device of the size of the display unit or bigger allows the events of the display unit to be controlled without losing one's grip on the pointing device. The pointing device of the display at the bottom of the device is ergonomically in an excellent place. A fourth preferred embodiment provides the advantage that the operational elements allow the device to be operated and used in more versatile ways.

Figure 1B:
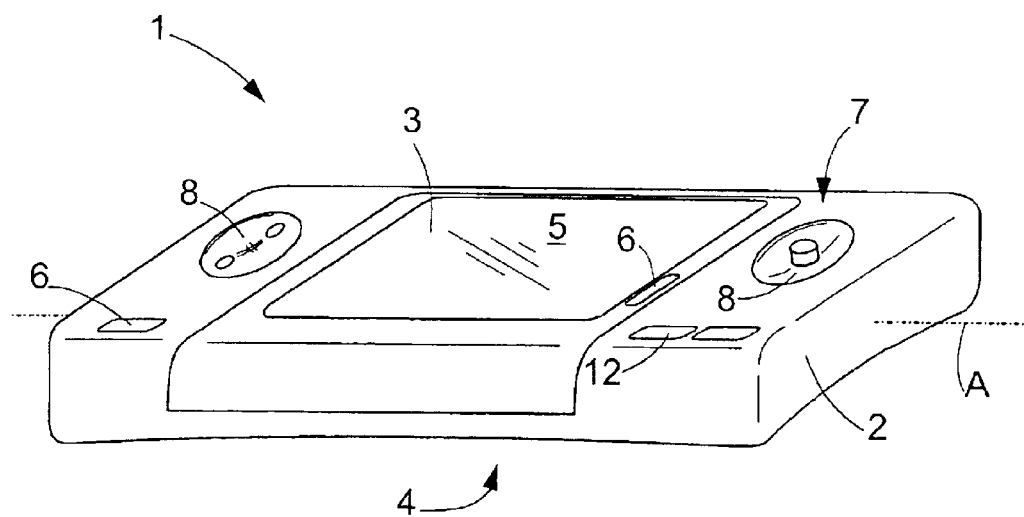
Figure 2A:
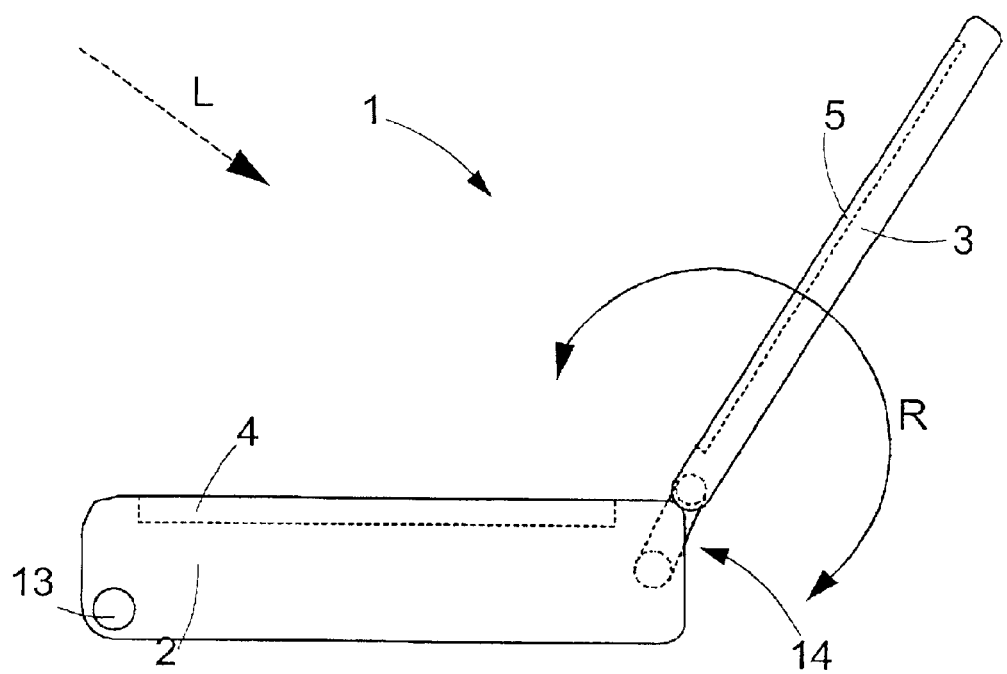
Figure 2B:
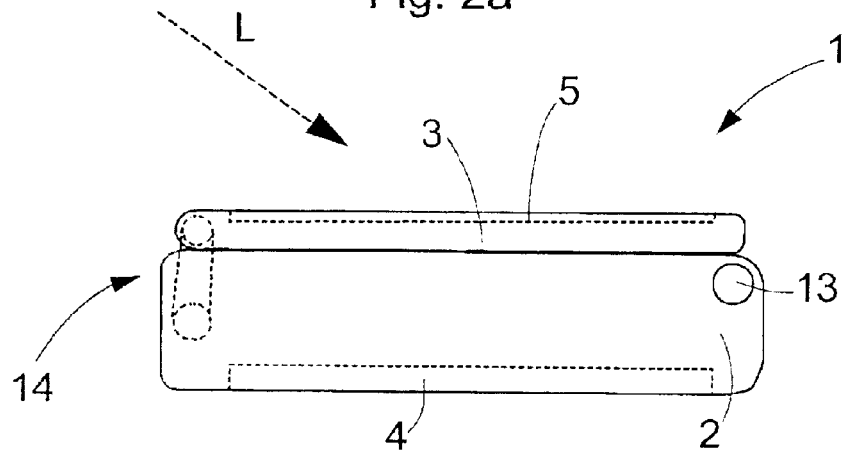
Figure 2C:
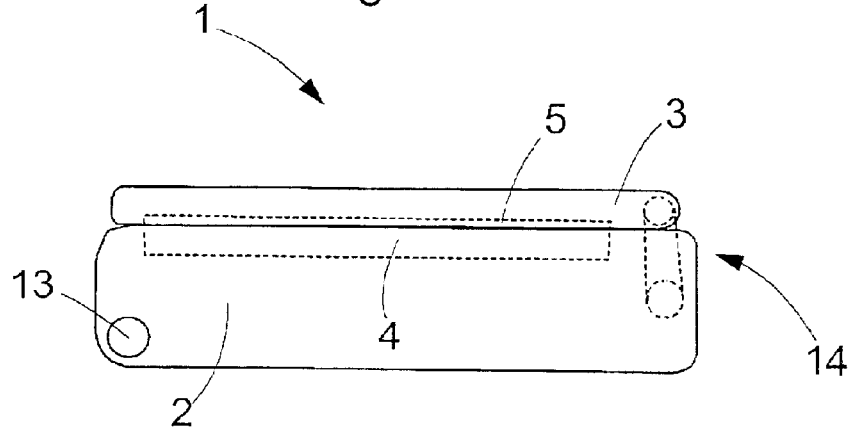
Figure 3:
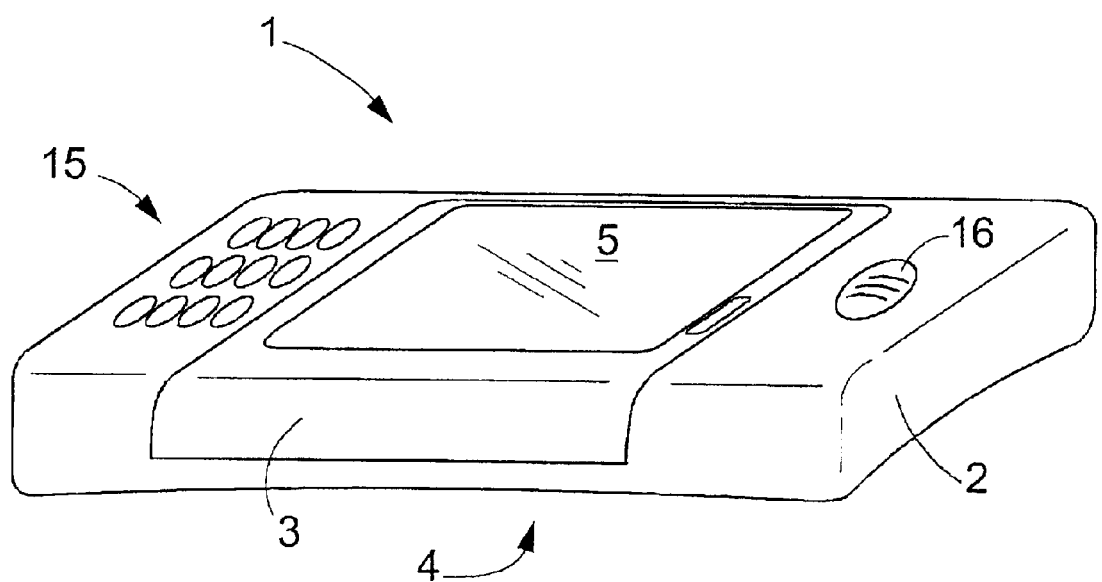

The invention will be described in greater detail in the attached drawings, in which FIG. 1a schematically shows a perspective view of an embodiment of a folding electronic device according to the invention in an open position, FIG. 1b schematically shows a perspective view of the embodiment of the folding electronic device according to FIG. 1a in a folded position, FIG. 2a schematically shows a side view of an embodiment of the folding electronic device according to the invention in the open position, FIG. 2b schematically shows a side view of the embodiment of the folding electronic device according to FIG. 2a in the folded position, FIG. 2c schematically shows a side view of the embodiment of the folding electronic device according to FIG. 2a in a second folded position, and FIG. 3 schematically shows a perspective view of a third embodiment of the folding electronic device according to the invention in a folded position.

FIG. 1a schematically shows a perspective view of an embodiment of a folding electronic device according to the invention in an open position, and FIG. 1b schematically shows a perspective view of the embodiment of the same folding electronic device in a folded position. The device 1 comprises a first part 2 and a second part 3, which are turnably attached to each other by means of hinge means. The attachment of the parts 2, 3 to each other can be implemented with hinge means known per se, and so the matter will not be discussed herein in greater detail. It is to be noted that the dimensions and shapes of the devices and parts thereof are shown in the figures only byway of example.

The first part 2 comprises data input means, which in the present embodiment of the invention consist of a mechanical keyboard 4, which, compared to the dimensions of the device 1, is big, preferably substantially of the size of the first part 2. The keys of the keyboard 4 are preferably arranged as a qwerty keyboard, which is, as well known, in a very common use and can thus be easily adopted by an occasional user as well. The keyboard may be of another type, too.

The second part 3 is provided with a display unit 5 preferably of the size of substantially the entire second part 3. The type of the display unit 5 is a grey or colour display known per se; the technique and properties of the display unit 5 are obvious to a person skilled in the art per se, and therefore the matter will not be discussed herein in greater detail. In the open position shown in FIG. 1a, second part 3 of the device is at an angle to the first part 2 and both the keyboard 4 and the display unit 5 are on the same side of the device 1. This position is particularly preferable when the PDA properties of the device 1 are utilised, for instance, in writing notes or messages or the like. The angle between the parts 2, 3 can be freely adjusted between its extreme positions, and thus the ergonomically best possible position to use the keyboard and display unit 5 can be achieved in each occasion.

FIG. 1b shows the device in a folded position and turned 180° with respect to the position in FIG. 1a around an imaginary axis A. The second part 3 is turned into a recess 18 (FIG. 1a) in the first part 2, whereupon the second part 3 and the outer surface of the first part 2 form a substantially even surface, which gives an aesthetically pleasant impression of the device 1. In the folded position, the device 1 is very small and it is easy to handle.

In the folded position, both the keyboard 4 and the display 5 are on the sides of the device 1 that can be seen from outside, i.e. on the outer sides, but on the different, reverse sides of the device 1. In other words, in FIG. 1b, the keyboard 4 is on the outer side of the device 1 that faces downwards, i.e. on the bottom side, where it cannot be seen, whereas the display 5 is on the outer side of the device that faces upwards.

The keyboard 4 is arranged on a concavely curved surface of the first part 2, whereupon it is protected so that in the position shown by FIG. 1b, for example when the device is laid onto a table, the surface of the table does not press against the keys of the keyboard 4 and accidental keystrokes can be avoided. To avoid accidental keystrokes, the keyboard 4 can also be fitted into a specific recess or it can be otherwise sunk so as to be protected by the bottom of the second part 3 of the device.

A mechanical keyboard refers herein to both a conventional mechanical keyboard where each key is spatially separated from other keys, and to a membrane keyboard where keys are arranged under a uniform membrane. A piezoelectric keyboard can also be used as a keyboard 4. In the piezoelectric keyboard, the keys of the keyboard are marked onto a substantially even surface 24 (FIG. 1b). When a key is pressed, the piezoelectric element 26 gives a light tactile feedback which can be sensed by the typing fingertip, whereupon the contact between the user and the keyboard is substantially improved. Also, a part of the keyboard 4, such as certain keys or a joystick provided in the keyboard, a touchpad or other similar pointing device known per se can operate as a pointing device. Thus, when the pointing device of the display is used, the rest of the keyboard can be mechanically or programmatically locked so that the device 1 would not react to accidental keystrokes.

Naturally, the parts 2, 3 of the device can also be provided with other operational elements, which can be used either in the folded or in the open position or in both positions. In the embodiment shown in FIGS. 1a and 1b, operating means of the device, i.e. keys 6 and a joystick 7, are provided at the front part of the first part 2, i.e. on the side facing away from the keyboard, and on the side of the second part 3 where the display unit 5 is. Some of the keys 6 and the joystick 7 are fitted into recesses 8 provided on the surface of the first part 2. Ergonomically the recesses 8 are arranged preferably so that the thumbs of the user of the folded device 1 touch them suitably and it is easy to use the operational means of the device provided in the recesses.

Both parts 2, 3 can also be provided with other operational means, components and elements well known per se by a person skilled in the art.

In a preferred embodiment, the operational means placed onto the side of the first part 2 that faces away from the keyboard 4 can be used for controlling the display information when the device 1 is in the open position, in other words when the keyboard 4 and the display 5 are on the same side of the device and said operational means are on the back side of the device 1, when seen from the user.

FIG. 2a schematically shows a side view of an embodiment of the folding electronic device according to the invention in an open position. The second part 3 comprising the display unit 5 is at an angle of about 125° to the first part 2 comprising the keyboard 4.

The keyboard 4 consists of a pointing device having a touchpad type of operational principle and being programmatically provided with keys that are required in the qwerty keyboard. It is to be noted that in the following, the term 'touchpad' is used to refer to the pointing device having a touchpad type of operational principle. The operation of the touchpad is obvious to a person skilled in the art, and therefore its operational principle will not be discussed in greater detail in this application.

The keyboard 4 has two operational modes: in the first operational mode, the keyboard 4 is used as a data input means for entering text or numerical data. The keyboard 4 thus operates as a conventional keyboard, and when a key patterned on the keyboard is pressed, a character represented by this key appears on the display or produces a certain function. The first operational mode is particularly preferable when the device 1 is in the open position, one example of which is given in FIG. 2a.

In the second operational mode, the keyboard 4 or a part of it operates as a pointing device of the display. With the pointing device of the display, the user of the device controls the pointer, such as the cursor of a graphic user interface, moving on the display of the display unit 5, uses the keyboard 4 as a joystick, scrolls or zooms the information or the like shown on the display unit 5. The second operational mode is particularly preferable when the parts 2, 3 of the device are turned into the folded position shown in FIG. 2b, in which position the device 1 is particularly suitable for performing conventional mobile phone functions or playing games, for instance. Thus, when the user holds the device in his hand so that the display unit 5 can be seen, i.e. it faces upwards, the keyboard 4 is on the bottom side of the device 1. The fingers of the user of the device 1 are set to a natural position on the keyboard 4 on the bottom side of the device, and it is simple and easy for the user to control the information of the display unit 5 by means of the keyboard 4. The use of the pointing device of the display does not require that the keyboard 4 must be seen.

The operational mode of the keyboard can be defined automatically, depending on the angle between the parts. The operational mode can also be selected with a switch 12 for selecting the operational mode or in some other way by user command, in which case both operational modes can be used both in the folded and in the open position.

In a preferred embodiment, the keyboard 4 in the second operational mode can be divided into sectors 20a, 20b, 22 (FIG. 1a), which can be defined as active or passive. Thus, the user of the device 1 can adapt the pointing device of the display according to his wishes or operational methods by selecting sectors 20a, 20b, 22, as active, depending on, for example, whether he uses forefingers or middle fingers or whether he uses the fingers of only one hand in order to control the display. The sectors 20a, 20b, 22, can be selected as active, for instance, by a specific switch 13 for selecting sectors or in some other suitable manner. When necessary, the selected sectors can naturally be changed.

The user looks at the device 1 from the direction of arrow L. Both the keyboard 4 and the display unit 5 are on the side of the device 1 where the user is, whereupon the PDA properties of the device can be utilised easily. The first part 3 is now substantially equally big as the second part 4. It is perfectly clear that the parts 3 and 4 can be of the same size or of a size different in every way. However, the display unit 5 is preferably as big as possible.

The hinge means of the device consist of a two-joint mechanical hinge 14 which allows the angle between the parts 2, 3 to be substantially adjusted continuously between the extreme positions. Alternatively, the angle between the parts 2, 3 is adjusted discontinuously, whereby the parts 2, 3 can be arranged at specific, determined angles with respect to each other. In each case, the hinges are implemented with hinge means well known per se by a person skilled in the art, for example with a flex hinge, and therefore they are not handled in greater detail herein. The antenna of the device 1 can be fitted into the hinge or hinge shaft.

FIG. 2b schematically shows a side view of the embodiment of the folding electronic device according to FIG. 2a in the folded position. Compared to FIG. 2a, the position of the device 1 has been changed by turning the second part 3 against the first part 2 and also by turning the entire device 1 upside down. The user looks at the device 1 from the direction of arrow L. Seen from the user, the keyboard surface on the back side of the device 1 operates as a pointing device of the display. The size and dimensions of the keyboard 4 are substantially the same as in the display unit 5, wherefore the pointing device can be used very logically and in a straightforward manner. The user need not lift his fingers up from the keyboard 4 in order to lead the cursor to a desired location on the display. Since the keyboard covers the entire area of the display unit 5, it is also possible that the cursor of the display is made to appear where the pointing fingertip is. In a preferred embodiment of the invention, the pointing device of the display is bigger than the display, and thus the display can be controlled in a particularly precise manner. Thus, the device 1 only comprises one display, the entire area of which can be utilized both in the folded and in the open position.

FIG. 2c schematically shows a side view of the embodiment of the folding electronic device according to FIG. 2a in a second folded position. The parts 2, 3 of the device 1 turn about 360° with respect to each other. In the second folded position, the display unit 5 is protected from potential outside blows, scratches or other similar loads that can damage the display. Therefore, the display unit 5 need not be protected by a protective window which reduces the readability of the display and causes component and assembly costs. Although the keyboard 4 and the display unit 5 are turned against each other, certain properties of the device can, however, be utilized.

FIG. 2c shows that there are no input or output devices on the outside shells of the device 1. These outside shells can be cast from magnesium, in which case they can be used as a frame for fixing the electronics. In this case, no separate frame has to be provided inside the device. A magnesium casing also gives the impression that the device 1 is of a good quality.

FIG. 3 schematically shows a perspective view of a third embodiment of the folding electronic device according to the invention in a folded position. The operating means of the device 1 comprises a numeric keypad 15, which is provided at the front part of the first part 2. Also, a loudspeaker 16 is arranged at the front part of the first part 2, but on the other side of the second part 3 as the loudspeaker 15. The numeric keypad 15 and the loudspeaker can be used for example for performing conventional mobile phone functions.

The drawings and the related description are only intended to illustrate the idea of the invention. In its details, the invention can vary within the scope of the claims. The biggest deflection angle between the parts 2, 3 can naturally be smaller than 360°. The device 1 can comprise locking elements by which the parts 2, 3 can be locked into a folded position, a second folded position and/or an open position. The device may also comprise more than two parts that turn with respect to each other. The area of the display control means can be bigger than the area of the keyboard 4. The shape of the parts and components of the device 1 can differ from what is shown in FIGS. 1a to 2c. It is also perfectly clear that the display unit 5 can be a touchscreen, in which case the functions of the device 1 can be controlled by touching the surface of the display unit 5.

The keyboard 4 can be a double-action keyboard, which can be used as a low-resolution pointer, even when the device 1 is in a folded position. The double-action keyboard has keys that can detect if they are being pressed or merely touched. When the device is in a folded position and the user touches a key, a corresponding item on the display is highlighted. The item is selected by pressing the key. The graphical interface is configured so, that the items coincidence with the keys. The keys of the keyboard are preferably arranged to straight columns and rows. This kind of pointing method can be used, for example, for conventional phone functions.

What is claimed is:

1. A folding electronic device comprising a first part and a second part arranged to turn with respect to the first part, the parts being turnable with respect to each other into a folded position and an open position, the first part comprising at least data input means and the second part comprising at least a display unit, wherein in the folded position, the data input means and the display unit are on different, outer sides of the device and that at least some of the, data input means are arranged to operate as a display pointing device of said display unit, and wherein operating means of the device are provided on the side of the first part opposite from the data input means.

2. An electronic device as claimed in claim 1, wherein the data input means consist of a keyboard.

3. An electronic device as claimed in claim 2, wherein the keyboard has a first operational mode and a second operational mode.

4. An electronic device as claimed in claim 3, wherein in the first operational mode, the keyboard is arranged to operate as a data input means and in the second operational mode, the keyboard or a part of it is arranged to operate as a pointing device of the display.

5. An electronic device as claimed in claim 3, wherein the operational mode of the keyboard is arranged to be determined on the basis of the angle between the parts of the device.

6. An electronic device as claimed in claim 3, wherein the operational mode of the keyboard is arranged to be selected by a user command.

7. An electronic device as claimed in claim 6, wherein the operational mode of the keyboard is arranged to be selected by a switch for selecting the operational mode.

8. An electronic device as claimed in claim 1, wherein the biggest deflection angle between the parts is about 360°.

9. An electronic device as claimed in claim 1, wherein the data input means consist of a qwerty keyboard.

10. An electronic device as claimed in claim 1, wherein the data input means consist of a mechanical keyboard.

11. An electronic device as claimed in claim 1, wherein the data input means consist of a touchpad provided with figures representing the keys of the keyboard.

12. An electronic device as claimed in claim 11, wherein the touchpad in the second operational mode can be divided into sectors that can be defined as active and passive.

13. An electronic device as claimed in claim 12, wherein the sectors of the touchpad are arranged to be defined by user command.

14. An electronic device as claimed in claim 12, wherein the sectors of the touchpad are arranged to be defined by a switch for selecting sectors.

15. An electronic device as claimed in claim 1, wherein the data input means are provided with a piezoelectric response function.

16. An electronic device as claimed in claim 1, wherein substantially the entire data input means are arranged to operate as a pointing device of the display or as apart of it.

17. An electronic device as claimed in claim 1, wherein a part of the data input means is arranged to operate as a pointing device of the display.

18. An electronic device as claimed in claim 17, wherein the pointing device of the display is a joystick provided at the data input means.

19. An electronic device as claimed in claim 17, wherein the pointing device of the display is a touchpad provided at the data input means.

20. An electronic device as claimed in claim 1, wherein operating means of the device are provided on the side of the first part that faces away from the data input means.

21. An electronic device as claimed in claim 20, wherein the operating means comprises a numeric keypad.

22. An electronic device as claimed in claim 1, wherein the data input means are fitted into a recess in the first part.

23. An electronic device as claimed in claim 1, wherein the dimensions of the pointing device of the display and those of the display unit are substantially similar.

24. An electronic device as claimed in claim 1, wherein when the device is in the open position, at least some of the operational means on the side of the first part that faces away from the data input means are arranged to operate as a pointing device of the display.

25. An electronic device as claimed in claim 1, wherein the device only comprises one display unit.

26. An electronic device as claimed in claim 1, wherein at least some part of the keyboard is arranged to operate as a low-resolution pointer at least when the device is in the folded position.

27. A folding electronic device comprising a first part and a second part arranged to turn with respect to the first part, the parts being turnable with respect to each other into a folded position and an open position, the first part comprising at least data input means and the second part comprising at least a display unit, wherein in the folded position, the display unit fits into a recess in the first part on, a side opposite the data input means, the side having operating means, and that at least some of the data input means are arranged to operate as a display pointing device of said display unit.

28. A folding electronic device as claims in claim 1, wherein between the folded position and the open position there is a second open position.

* * * * *